(12) United States Patent
Chiu et al.

(10) Patent No.: US 10,380,719 B2
(45) Date of Patent: Aug. 13, 2019

(54) DEVICE AND METHOD FOR GENERATING PANORAMA IMAGE

(71) Applicant: HON HAI PRECISION INDUSTRY CO., LTD., New Taipei (TW)

(72) Inventors: Kuan-Jung Chiu, New Taipei (TW); Yu-Cheng Chen, New Taipei (TW); Chi-Hsun Ho, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 32 days.

(21) Appl. No.: 15/715,172

(22) Filed: Sep. 26, 2017

(65) Prior Publication Data

US 2019/0066264 A1 Feb. 28, 2019

(30) Foreign Application Priority Data

Aug. 28, 2017 (CN) .......................... 2017 1 0752370

(51) Int. Cl.
*G06T 3/40* (2006.01)
*G06T 7/30* (2017.01)
(Continued)

(52) U.S. Cl.
CPC .......... *G06T 3/4038* (2013.01); *G06F 16/434* (2019.01); *G06F 16/583* (2019.01); *G06F 16/5866* (2019.01); *G06T 7/30* (2017.01)

(58) Field of Classification Search
CPC .... H04N 5/23238; H04N 7/183; H04N 7/181; H04N 21/6587; H04N 5/2258; H04N 13/00; H04N 13/0242; H04N 13/106; H04N 17/002; H04N 5/2254; H04N 5/232; H04N 5/23206; H04N 5/247; H04N 5/265; H04N 9/8042; H04N 19/13; H04N 19/597; H04N 19/61; H04N 19/615; H04N 19/619; H04N 19/63; H04N 5/2259; H04N 5/2628; A61B 1/00009; A61B 5/061; A61B 5/065;
(Continued)

(56) References Cited

U.S. PATENT DOCUMENTS 4,868,692 A * 9/1989 Nakase ................. G11B 5/592
360/77.16
6,157,747 A * 12/2000 Szeliski ................. G06K 9/209
345/419
(Continued)

FOREIGN PATENT DOCUMENTS

CN 105701767 6/2016
TW 201235870 9/2012

*Primary Examiner* — Aklilu K Woldemariam
(74) *Attorney, Agent, or Firm* — ScienBiziP, P.C.

(57) ABSTRACT

A device for splicing together sub-images for a single panorama image searches a plurality of images taken from different angles in an image library. Modules in the device receive basic information and obtain image searching information. First images are extracted from the image library according to the image searching information and second images that comprise different azimuth angles and match a predetermined environmental parameter are selected from the first images. An optimal image of each azimuth angle is extracted from the second images according to environmental and image parameters and adjustments to each optimal image are made to splice together the panorama image. A panorama image generating method is also provided.

16 Claims, 6 Drawing Sheets panorama image

(51) Int. Cl.
*G06F 16/432* (2019.01)
*G06F 16/583* (2019.01)
*G06F 16/58* (2019.01)

(58) Field of Classification Search
CPC .......... G06F 17/30247; G06F 3/04815; G06K
9/00281; G06K 9/6202; G06K
2009/3291; G06K 2009/363; G06K
9/00234; G06K 9/00241; G06K 9/00295;
G06K 9/209; G06K 2009/2045; G06K
9/32; G06K 9/00208; G06T 3/40; G06T
7/337; G06T 3/0018; G06T 7/277; G06T
7/292; G06T 7/74; G06T 7/77; G06T
3/0062; G06T 2207/20016; G06T 7/80;
G06T 2200/28; G06T 3/4038; H05B
37/0227; G03H 2001/2244; G02B 13/06;
G02B 27/2228; G03B 35/08; G03B
37/04; G03B 37/06
USPC ........ 382/154, 276, 293, 294; 345/157, 649;
348/36, 164, 169
See application file for complete search history.

(56) References Cited

U.S. PATENT DOCUMENTS

| | | | | |
|---|---|---|---|---|
| 6,959,120 B1* | 10/2005 | Zhang | ................ | H04N 19/597 345/427 |
| 7,058,239 B2* | 6/2006 | Singh | ................ | G02B 13/06 348/36 |
| 7,123,777 B2* | 10/2006 | Rondinelli | ............ | G06T 3/0062 382/284 |
| 7,933,395 B1* | 4/2011 | Bailly | ................ | G06F 3/04815 379/201.04 |
| 8,798,451 B1* | 8/2014 | Kweon | ................ | G03B 37/06 348/36 |
| 2002/0113805 A1* | 8/2002 | Li | ................ | G06F 3/04815 345/649 |
| 2002/0118890 A1* | 8/2002 | Rondinelli | ............ | G06T 3/0062 382/276 |
| 2004/0169724 A1* | 9/2004 | Ekpar | ................ | G06T 3/0062 348/36 |
| 2005/0031214 A1* | 2/2005 | Zhang | ................ | H04N 19/597 382/232 |
| 2005/0212909 A1* | 9/2005 | Takehara | ............ | H04N 5/232 348/36 |
| 2006/0187305 A1* | 8/2006 | Trivedi | ............ | G06K 9/00234 348/169 |
| 2007/0002015 A1* | 1/2007 | Mohri | ................ | G06F 3/014 345/157 |
| 2007/0109398 A1* | 5/2007 | Teo | ................ | H04N 5/23238 348/36 |
| 2011/0032371 A1* | 2/2011 | Teramoto | ............ | H04N 5/23232 348/220.1 |
| 2011/0096136 A1* | 4/2011 | Liu | ................ | H04N 7/144 348/14.07 |
| 2011/0216159 A1* | 9/2011 | Yoshizunni | ............ | H04N 5/225 348/36 |
| 2011/0310219 A1* | 12/2011 | Kim | ................ | G08B 13/19643 348/36 |
| 2013/0258044 A1* | 10/2013 | Betts-Lacroix | ...... | H04N 13/243 13/243 |
| 2014/0146132 A1* | 5/2014 | Bagnato | ............ | G02B 27/2228 348/36 |
| 2016/0058426 A1* | 3/2016 | Hedlund | ............ | A61B 8/54 600/410 |
| 2017/0023688 A1* | 1/2017 | Schneider, Jr. | ........ | G01V 1/325 |
| 2018/0082438 A1* | 3/2018 | Simon | ................ | G06T 7/80 |
| 2018/0139431 A1* | 5/2018 | Simek | ................ | H04N 5/2258 |

* cited by examiner

DEVICE AND METHOD FOR GENERATING PANORAMA IMAGE

FIELD

The subject matter herein generally relates to device and method for image capturing, and generating panorama image.

BACKGROUND

A plurality of images is stored in electronic devices or servers just as taken. The images stored in the electronic devices or the servers are always two dimensional.

BRIEF DESCRIPTION OF THE DRAWINGS

Implementations of the present technology will now be described, by way of example only, with reference to the attached figures.

DETAILED DESCRIPTION

Figure 1:
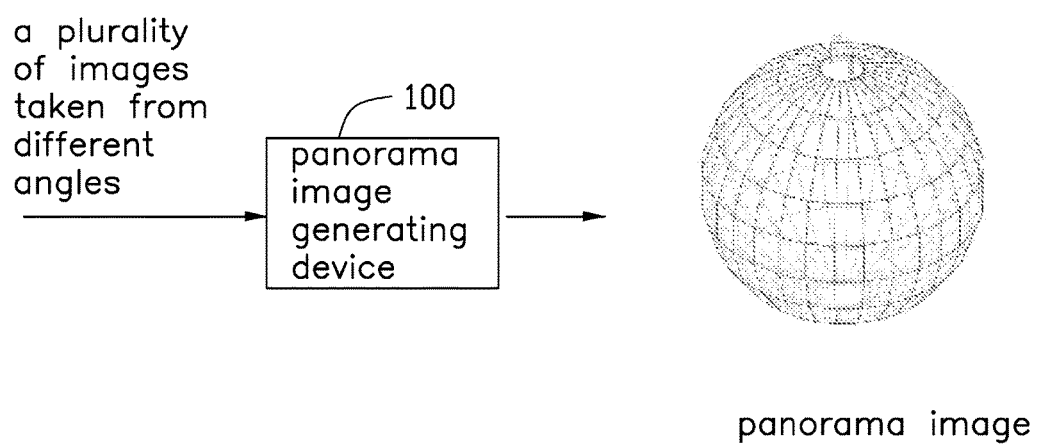
FIG. 1 is a diagram of an exemplary embodiment of a panorama image generating device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 illustrates a panorama image generating device 100 in accordance with an exemplary embodiment.

The panorama image generating device 100 is configured to splice a plurality of images taken from different angles to generate a panorama image.

In one exemplary embodiment, the panorama image can be a 180 degrees panorama image, a 270 degrees panorama image, a 360 degrees panorama image, or other. The 180 degrees panorama image can be a hemispherical panorama image and the 360 degrees panorama image can be a spherical panorama image.

Figure 2:
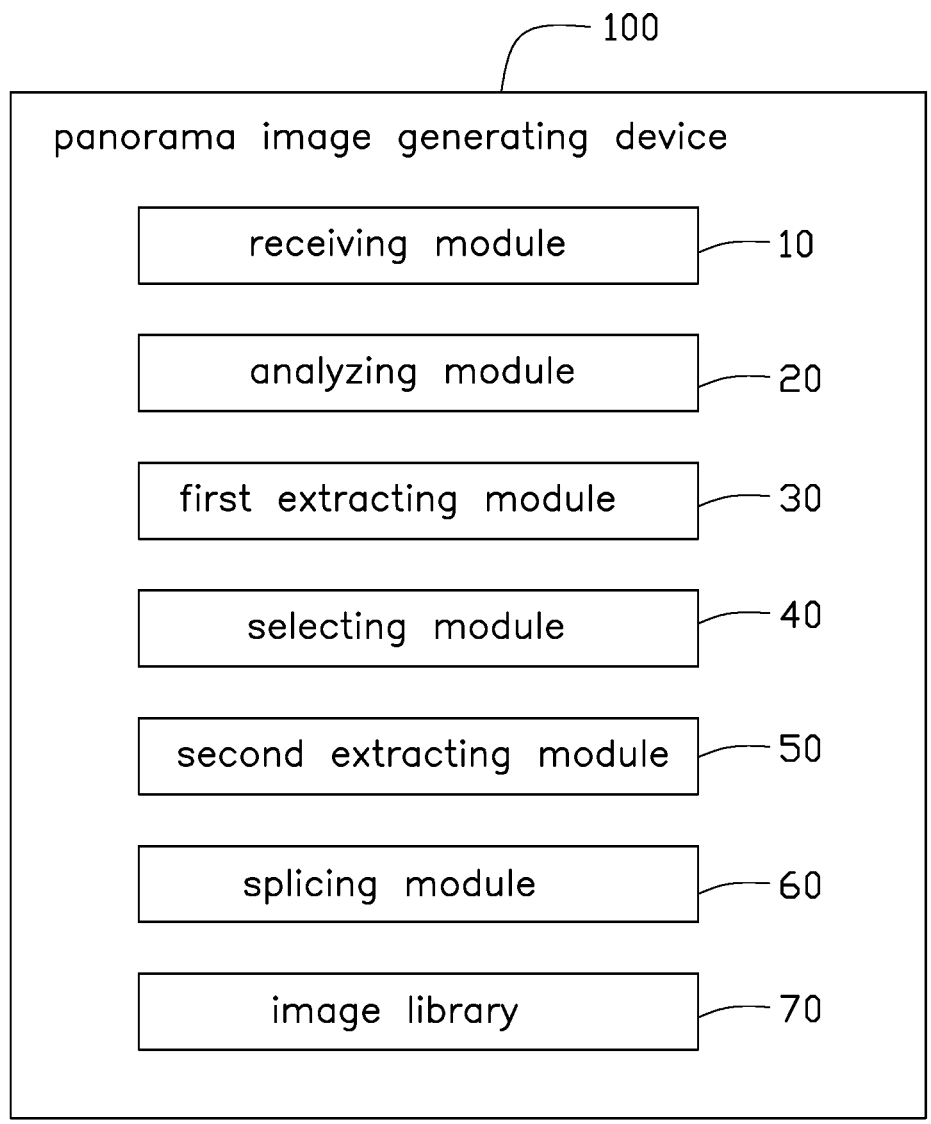
FIG. 2 is a block diagram of an exemplary embodiment of the panorama image generating device of FIG. 1.

Referring to FIG. 2, the panorama image generating device 100 can comprise at least one storage 11 and at least one processor 12. The panorama image generating device 100 can further comprise a plurality of modules, such as a receiving module 10, an analyzing module 20, a first extracting module 30, a selecting module 40, a second extracting module 50, and a splicing module 60. The modules 10-60 can comprise one or more software programs in the form of computerized codes stored in the storage 11. The computerized codes can include instructions that can be executed by the processor 12 to provide functions for the modules 10-60.

In one exemplary embodiment, the panorama image generating device 100 can further comprise an image library 70. The image library 70 comprises a plurality of images. Each image comprises an environmental parameter and an image parameter. The environmental parameter of each image can comprise an azimuth angle, an aperture, a shutter speed, an exposure value, a light angle, or a wind speed, for example. The image parameter of each image can comprise a depth of field (DOF) value, a color, a brightness, a sharpness, or a focal length, for example. The image library 70 can be stored in the storage 11 or a remote server (not shown). When the image library 70 is stored in the remote server, the panorama image generating device 100 can connect to the remote server to access the image library 70.

In one exemplary embodiment, a part of the image library 70 can be stored in the storage 11 and another part of the image library 70 can be stored in the remote server.

The receiving module 10 is configured to receive basic information for search purpose. The basic information can be image information, voice information, and character information.

For example, a panorama image about the opening ceremony of the Beijing Olympic Games (Aug. 8, 2008) may be desired. An user can input a text or a sound with respect to the opening ceremony of the Beijing Olympic Games in 2008 as the basic information to the panorama image generating device 100. Then, the panorama image generating device 100 can splice together a plurality of images captured in the opening ceremony of the Beijing Olympic Games to generate the panorama image for watching. The panorama image generated by the panorama image generating device 100 further can be viewed through a mobile device or a virtual reality (VR) device.

In one exemplary embodiment, the user further can input an image that was captured in the opening ceremony of the Beijing Olympic Games as the basic information to the panorama image generating device 100. Then, the panorama image generating device 100 can splice a plurality of images captured in the opening ceremony of the Beijing Olympic Games to generate the panorama image.

The analyzing module 20 is configured to analyze the basic information to obtain image searching information.

For example, when the receiving module 10 receives the text or the sound with respect to the opening ceremony of the Beijing Olympic Games in 2008, the analyzing module 20 analyzes the text or the sound to obtain the image searching information. The image searching information can comprise time information (Aug. 8, 2008), location information (Beijing), and scene information (the opening ceremony of Olympic Games). When the receiving module 10 receives an image captured in the opening ceremony of the Beijing Olympic Games, the analyzing module 20 analyzes the image to obtain a capturing location and a capturing time. Then, the analyzing module 20 can obtain the image searching information comprising the time information (Aug. 8, 2008), the location information (Beijing), and the scene information (the opening ceremony of Olympic Games).

The first extracting module 30 is configured to extract first images from the image library 70 according to the image searching information.

For example, when the image library 70 comprises two hundred images with respect to the opening ceremony of the Beijing Olympic Games, the first extracting module 30 can extract two hundred first images from the image library 70.

The selecting module 40 is configured to select from the first images second images that comprise different azimuth angles and match a predetermined environmental parameter.

In one exemplary embodiment, the predetermined environmental parameter can comprise the aperture, the exposure value, and the light angle. The predetermined environmental parameter can be set as a threshold value or an interval value to filter out unnecessary images.

The second extracting module 50 is configured to extract an optimal image of each azimuth angle from the second images according to an environmental parameter and an image parameter of each second image. The optimal images can be adjacent azimuth angle second images that comprise a value of the minimum difference from the environmental parameter and the image parameter.

For example, after the selecting module 40 selects the second images from the first images, the second images comprise three images of azimuth angle A, five images of azimuth angle B, four images of azimuth angle C, and seven images of azimuth angle D. The splicing module 60 only needs one image of azimuth angle A, one image of azimuth angle B, one image of azimuth angle C, and one image of azimuth angle D to splice and generate the panorama image. The second extracting module 50 obtains the environmental parameters and the image parameters of each second image and extracts each optimal image of the azimuth angle A, the azimuth angle B, the azimuth angle C, and the azimuth angle D according to the minimum different values (of the environmental parameter and the image parameter) among the adjacent azimuth angle images, to reduce vision disparity of the panorama image.

In one exemplary embodiment, the optimal images also can be the different azimuth angle images that comprise the optimal environmental parameters and/or the optimal image parameters.

The splicing module 60 is configured to adjust the image parameter of each optimal image to splice the panorama image.

In one exemplary embodiment, the splicing module 60 can adjust the DOF value, the color, the brightness, the sharpness, and the focal length of each optimal image and splice the adjusted optimal image to generate the panorama image.

Figure 3:
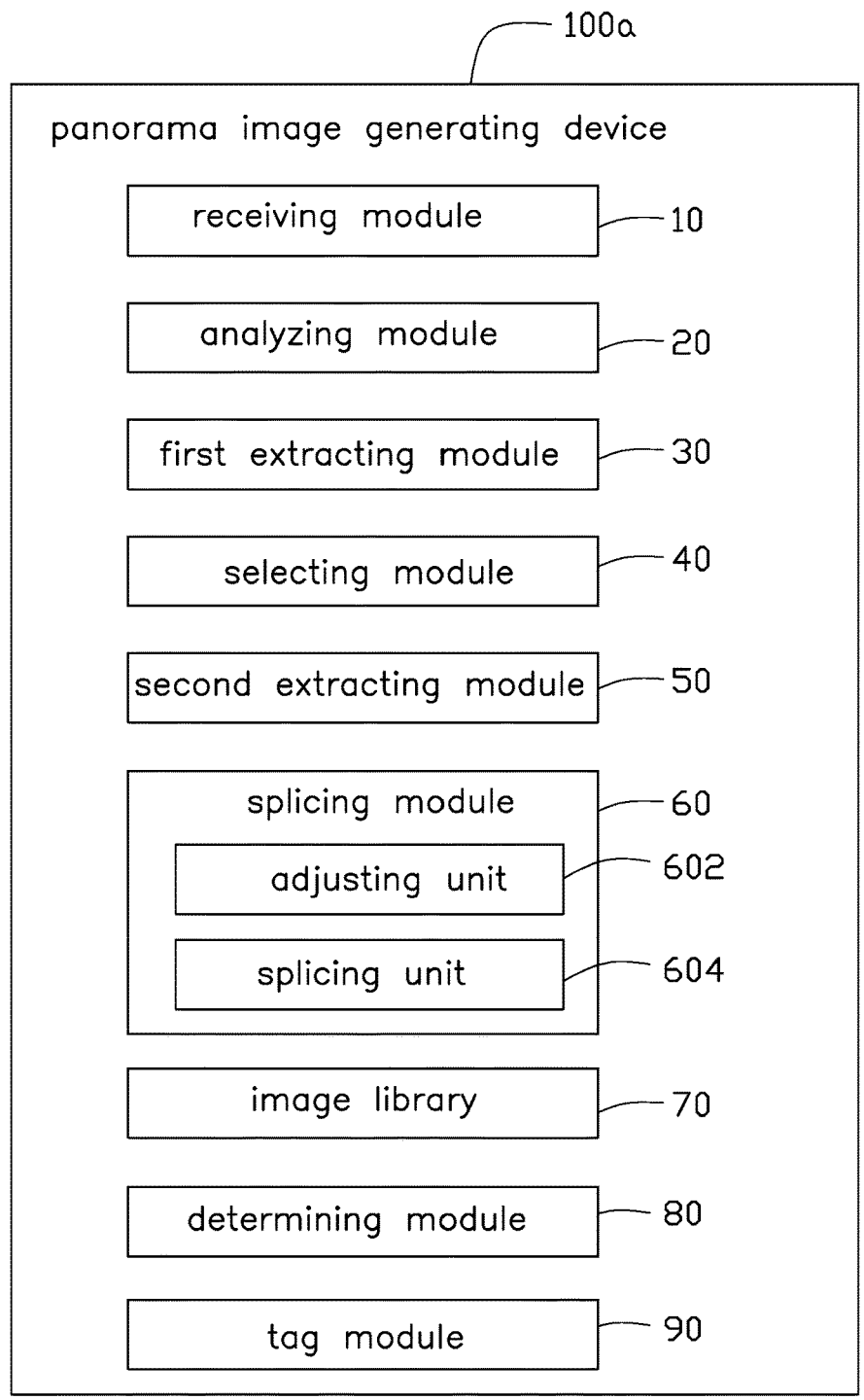
FIG. 3 is a block diagram of another exemplary embodiment of the panorama image generating device of FIG. 1.
Figure 4:
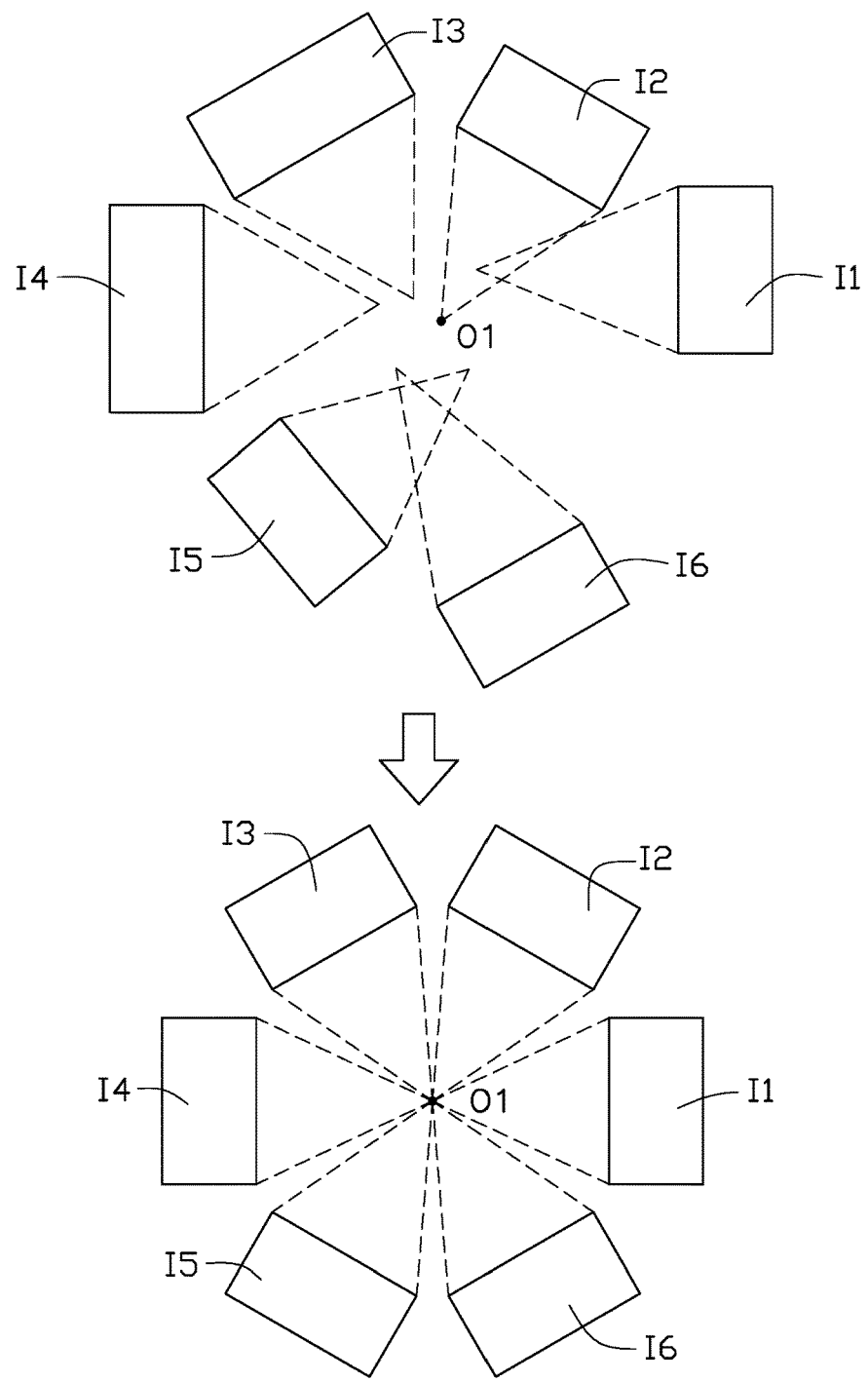
FIG. 4 is a diagram of an exemplary embodiment of a plurality of optimal images adjusted according to a correction center point in the device of FIG. 1.

FIG. 3 illustrates a panorama image generating device 100a in accordance with an exemplary embodiment. The splicing module 60 of the panorama image generating device 100a comprises an adjusting unit 602 and a splicing unit 604. Each optimal image may comprise different focal lengths needing to be adjusted before splicing. The adjusting unit 602 is configured to adjust the focal length of each optimal image according to a correction center point O1 (as shown in FIG. 4). A size and/or angle of each optimal image can be adjusted. After the adjusting unit 602 adjusts the focal length of each optimal image, the focal length of each optimal image are almost the same. The adjusting unit 602 is further configured to adjust the image parameter of each optimal image. The splicing unit 604 is configured to select as a first optimal image a start of splice image which has the focal length nearest to the correction center point O1, to begin splicing the panorama image.

In one exemplary embodiment, the splicing unit 604 calculates a value of difference between the adjusted focal length of each optimal image and the correction center point O1. The splicing unit 604 selects as the first optimal image the start of splice image which has the adjusted focal length of the first optimal image at a minimum difference value with respect to the correction center point O1. When the first optimal image is selected as the start of splice image, the splicing unit 604 splices around the first optimal image to generate the panorama image.

Referring to FIG. 4, the adjusting unit 602 adjusts the focal lengths of six optimal images, I1 to I6, according to the correction center point O1. If the optimal image I1 has the minimum difference value with respect to the correction center point O1, the splicing unit 604 selects the optimal image I1 as the start of splice image and splices around the optimal image I1, to generate the panorama image.

In one exemplary embodiment, the basic information can be an image of a photo album. The panorama image generating devices 100 and 100a can be a portable electronic device.

Referring to FIG. 3, the panorama image generating device 100a (with respect to the panorama image generating device 100 of FIG. 2) further comprises a determining module 80 and a tag module 90.

The determining module 80 is configured to determine whether the extracted optimal images provide sufficient or correct content to splice at least one predetermined angle type of the panorama image. For example, the panorama image comprises three types (180 degrees panorama image, 270 degrees panorama image, 360 degrees panorama image). The determining module 80 determines whether the extracted optimal images provides sufficient and correct content to splice one of the three types of the panorama image.

If the determining module 80 determines that the extracted optimal images can be spliced to one or more types of the panorama image, the tag module 90 adds a maximum angle tag on the image of the photo album. For example, the determining module 80 determines that the extracted optimal images can splice the 180 degrees panorama image and the 270 degrees panorama image. Then, the tag module 90 can add a 270 degrees tag on the image of the photo album. The user can click the 270 degrees tag of the image to control the panorama image generating device 100a to generate the 270 degrees panorama image.

If the determining module 80 determines that the extracted optimal images provide insufficient splicing for any type of the panorama image, the tag module 90 does not add an angle tag on the image of the photo album.

In one exemplary embodiment, if the determining module 80 determines that the extracted optimal images cannot splice any types of the panorama image, the tag module 90 adds a splicing-unable tag on the image of the photo album.

In one exemplary embodiment, if one type of the panorama image is lacking one or more azimuth angle optimal images, the determining module 80 determines that the extracted optimal images cannot be spliced for the type of the panorama image desired.

In one exemplary embodiment, if one type of the panorama image is lacking a few parts of image, the splicing module 60 can infill missing parts of image through a content aware technology.

Figure 5:
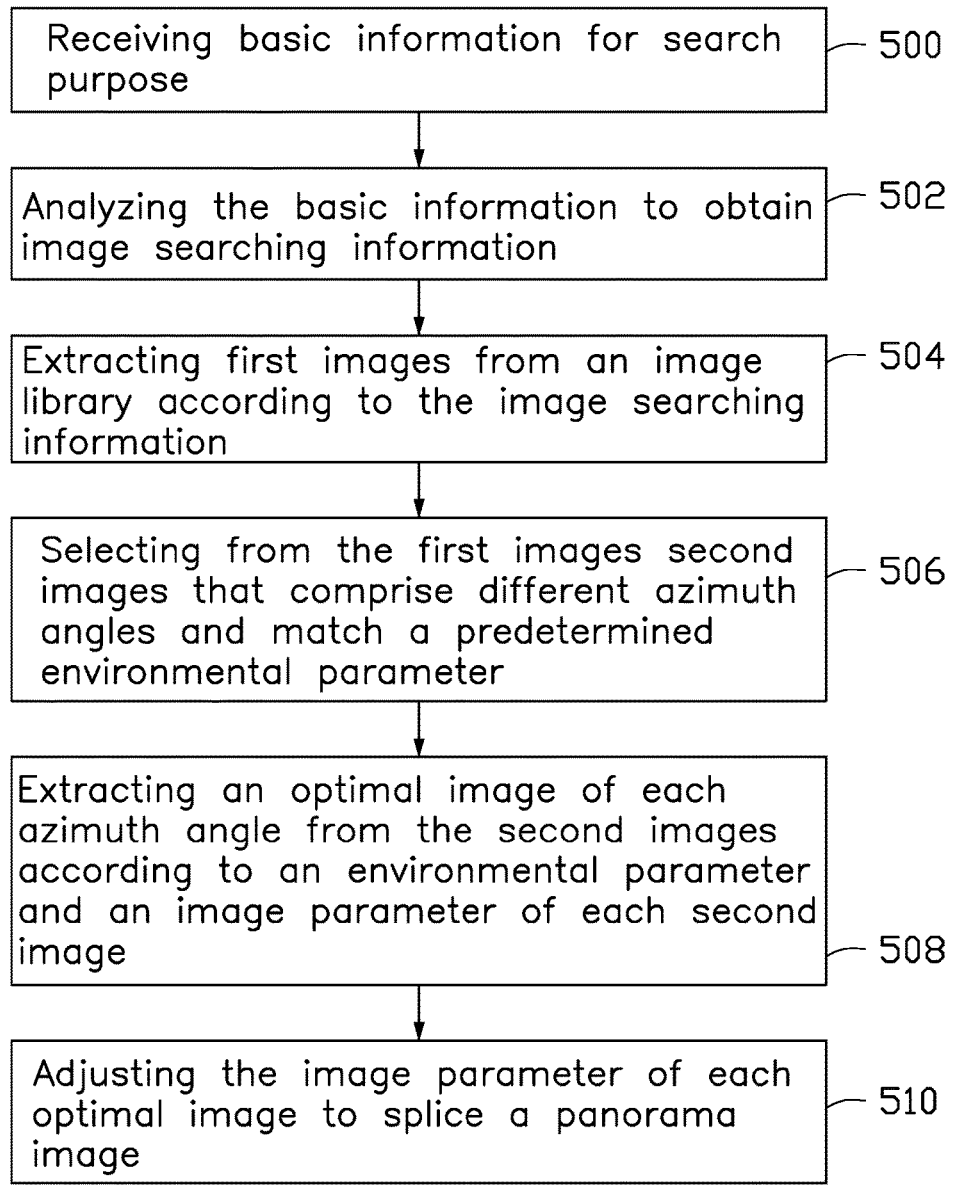
FIG. 5 is a flow diagram of an exemplary embodiment of a panorama image generating method of the panorama image generating device of FIG. 1.

FIG. 5 illustrates one exemplary embodiment of a panorama image generating method. The flowchart presents an exemplary embodiment of the method. The exemplary method is provided by way of example, as there are a variety of ways to carry out the method. The method described below can be carried out using the configurations illustrated in FIGS. 1-3, for example, and various elements of these figures are referenced in explaining the example method. Each step shown in FIG. 5 may represent one or more processes, methods, or subroutines, carried out in the example method. Furthermore, the illustrated order of steps is illustrative only and the order of the steps can change. Additional steps can be added or fewer steps may be utilized, without departing from this disclosure. The example method can begin at step 500.

In step 500, the receiving module 10 receives basic information for search purpose.

In step 502, the analyzing module 20 analyzes the basic information to obtain image searching information.

In step 504, the first extracting module 30 extracts first images from the image library 70 according to the image searching information.

In step 506, the selecting module 40 selects from the first images second images that comprise different azimuth angles and match a predetermined environmental parameter.

In step 508, the second extracting module 50 extracts an optimal image of each azimuth angle from the second images according to an environmental parameter and an image parameter of each second image.

In step 510, the splicing module 60 adjusts the image parameter of each optimal image to splice the panorama image.

Figure 6:
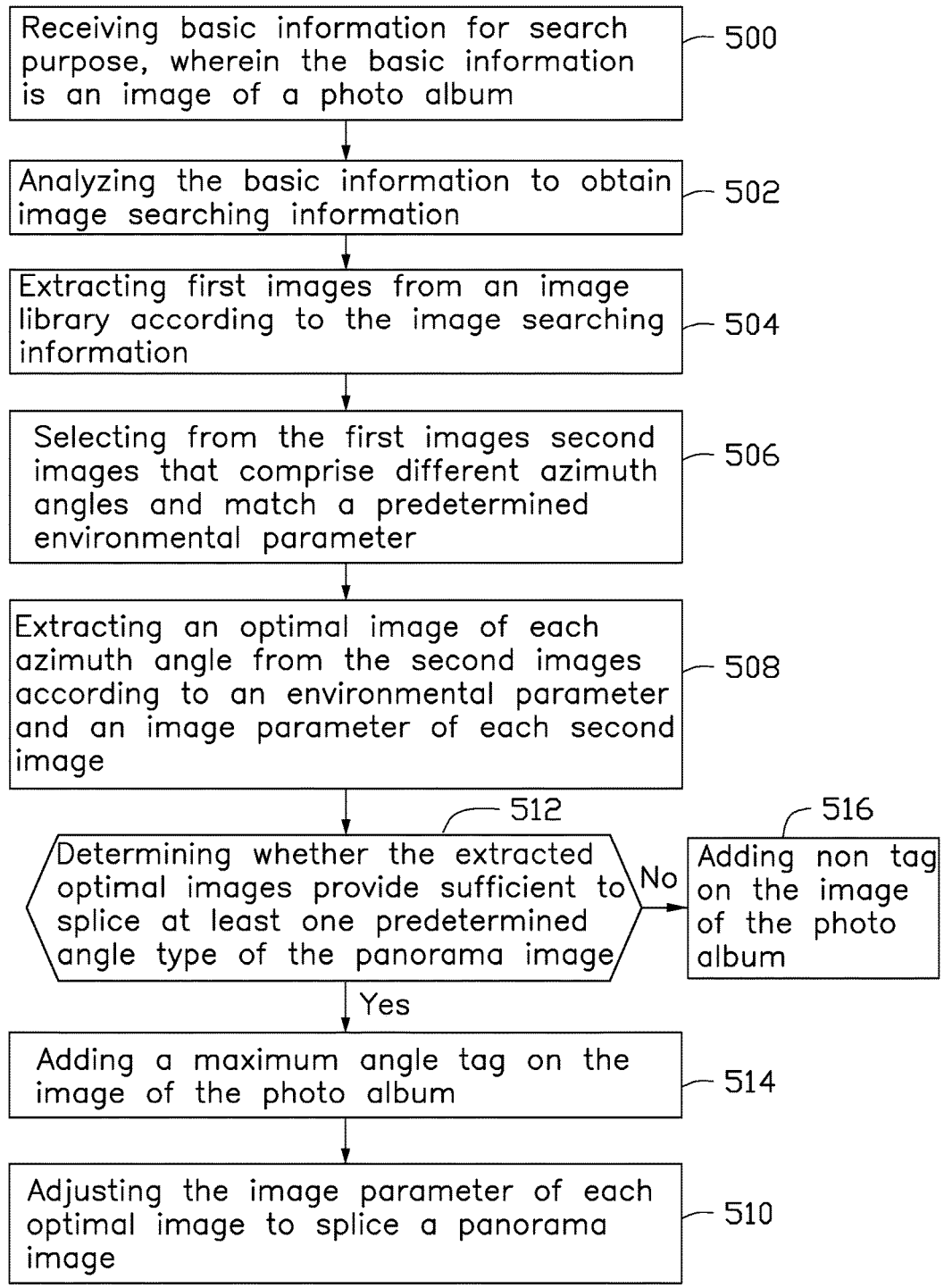
FIG. 6 is a flow diagram of another exemplary embodiment of a panorama image generating method.

FIG. 6 illustrates another exemplary embodiment of the panorama image generating method.

In step 500, the receiving module 10 receives basic information for search purpose, wherein the basic information is an image of a photo album.

In step 512, the determining module 80 determines whether the extracted optimal images provide sufficient to splice at least one predetermined angle type of the panorama image.

In step 514, if the determining module 80 determines that the extracted optimal images can be spliced to one or more types of the panorama image, the tag module 90 adds a maximum angle tag on the image of the photo album.

In step 516, if the determining module 80 determines that the extracted optimal images provide insufficient splicing for any type of the panorama image, the tag module 90 does not add an angle tag on the image of the photo album.

In one exemplary embodiment, if the determining module 80 determines that the extracted optimal images provide insufficient splicing for any types of the panorama image, the tag module 90 adds a splicing-unable tag on the image of the photo album.

The exemplary embodiments shown and described above are only examples. Many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A panorama image generating method, comprising:
receiving basic information for search purpose;
analyzing the basic information to obtain image searching information;
extracting first images from an image library according to the image searching information;
selecting from the first images second images that comprise different azimuth angles and match a predetermined environmental parameter;
extracting an optimal image of each azimuth angle from the second images according to an environmental parameter and an image parameter of each second image; and
adjusting the image parameter of each optimal image to splice a panorama image;
wherein adjusting the image parameter of each optimal image to splice the panorama image comprises:
adjusting a focal length of each optimal image according to a correction center point;
adjusting the image parameter of each optimal image;
selecting a first optimal image which has the focal length nearest to the correction center point as a start of splice image to begin splicing the panorama image;
calculating a value of difference between the adjusted focal length of each optimal image and the correction center point; and
selecting the first optimal image which has the adjusted focal length of the first optimal image at a minimum difference value with respect to the correction center point as the start of splice image.

2. The panorama image generating method of claim 1, wherein selecting the first optimal image which has the focal length nearest to the correction center point as the start of splice image to begin splicing the panorama image comprises:
splicing around the first optimal image to generate the panorama image.

3. The panorama image generating method of claim 1, wherein the basic information comprises image information, voice information, and character information.

4. The panorama image generating method of claim 1, wherein the optimal images are adjacent azimuth angle second images that comprise a value of the minimum difference from the environmental parameter and the image parameter.

5. The panorama image generating method of claim 1, wherein the basic information is an image of a photo album and the panorama image comprises a plurality of predetermined angle types.

6. The panorama image generating method of claim 5, further comprising:
determining whether the extracted optimal images provide sufficient to splice at least one predetermined angle type of the panorama image; and adding a maximum angle tag on the image of the photo album in response to the extracted optimal images being spliced to one or more types of the panorama image.

7. The panorama image generating method of claim 6, further comprising:
adding non tag on the image of the photo album in response to the extracted optimal providing insufficient splicing for any type of the panorama image.

8. The panorama image generating method of claim 6, further comprising:
adding a splicing-unable tag on the image of the photo album in response to the extracted optimal providing insufficient splicing for any type of the panorama image.

9. A panorama image generating device comprising:
at least one processor;
a storage; and
one or more programs that are stored in the storage unit and executed by the at least one processor, the one or more programs comprising instructions for:
receiving basic information for search purpose;
analyzing the basic information to obtain image searching information;
extracting first images from an image library according to the image searching information;
selecting from the first images second images that comprise different azimuth angles and match a predetermined environmental parameter;
extracting an optimal image of each azimuth angle from the second images according to an environmental parameter and an image parameter of each second image;
adjusting a focal length of each optimal image according to a correction center point;
selecting a first optimal image which has the focal length nearest to the correction center point as a start of splice image to begin splicing a panorama image;
calculating a value of difference between the adjusted focal length of each optimal image and the correction center point; and
selecting the first optimal image which has the adjusted focal length of the first optimal image at a minimum difference value with respect to the correction center point as the start of splice image.

10. The panorama image generating device of claim 9, wherein selecting the first optimal image which has the focal length nearest to the correction center point as the start of splice image to begin splicing the panorama image comprises:
splicing around the first optimal image to generate the panorama image.

11. The panorama image generating device of claim 9, wherein the basic information comprises image information, voice information, and character information.

12. The panorama image generating device of claim 9, wherein the optimal images are adjacent azimuth angle second images that comprise a value of the minimum difference from the environmental parameter and the image parameter.

13. The panorama image generating device of claim 9, wherein the basic information is an image of a photo album and the panorama image comprises a plurality of predetermined angle types.

14. The panorama image generating device of claim 13, wherein the one or more programs further comprise:
determining whether the extracted optimal images provide sufficient to splice at least one predetermined angle type of the panorama image; and
adding a maximum angle tag on the image of the photo album in response to the extracted optimal images being spliced to one or more types of the panorama image.

15. The panorama image generating device of claim 14, wherein the one or more programs further comprise:
adding non tag on the image of the photo album in response to the extracted optimal providing insufficient splicing for any type of the panorama image.

16. The panorama image generating device of claim 14, wherein the one or more programs further comprise:
adding a splicing-unable tag on the image of the photo album in response to the extracted optimal providing insufficient splicing for any type of the panorama image.

* * * * *